United States Patent
Aoyama et al.

(10) Patent No.: US 12,552,334 B2
(45) Date of Patent: Feb. 17, 2026

(54) IN-VEHICLE DEVICE, PROGRAM, AND INFORMATION PROCESSING METHOD

(71) Applicants: Sumitomo Wiring Systems, Ltd., Yokkaichi (JP); Nissan Motor Co., Ltd., Yokohama (JP)

(72) Inventors: Toru Aoyama, Yokkaichi (JP); Ryusei Ayukawa, Yokkaichi (JP); Takanori Ito, Yokkaichi (JP); Kaishi Tagushi, Atsugi (JP)

(73) Assignees: Sumitomo Wiring Systems, Ltd., Yokkaichi (JP); Nissan Motor Co., Ltd., Yokohama (JP)

( * ) Notice: Subject to any disclaimer, the term of this patent is extended or adjusted under 35 U.S.C. 154(b) by 140 days.

(21) Appl. No.: 18/554,178

(22) PCT Filed: Mar. 28, 2022

(86) PCT No.: PCT/JP2022/014986
§ 371 (c)(1),
(2) Date: Oct. 5, 2023

(87) PCT Pub. No.: WO2022/215576
PCT Pub. Date: Oct. 13, 2022

(65) Prior Publication Data
US 2024/0181982 A1 Jun. 6, 2024

(30) Foreign Application Priority Data
Apr. 8, 2021 (JP) .................... 2021-066074

(51) Int. Cl.
*B60R 16/02* (2006.01)
*B60R 16/023* (2006.01)
*G07C 5/08* (2006.01)

(52) U.S. Cl.
CPC ........ *B60R 16/0231* (2013.01); *G07C 5/0808* (2013.01)

(58) Field of Classification Search
CPC ... B60R 16/0231; B60R 16/02; G07C 5/0808; B60W 50/04; B60W 50/02;
(Continued)

(56) References Cited

U.S. PATENT DOCUMENTS 5,583,770 A 12/1996 Sekido et al.
2009/0259419 A1 10/2009 Kasai

FOREIGN PATENT DOCUMENTS

| CN | 106557083 B | 10/2018 |
|---|---|---|
| EP | 2955699 A1 | 12/2015 |

(Continued)

OTHER PUBLICATIONS

International Search Report, Application No. PCT/JP2022/014986, mailed May 24, 2022.

*Primary Examiner* — Michael V Kerrigan
(74) *Attorney, Agent, or Firm* — Honigman LLP

(57) ABSTRACT

An in-vehicle device is an in-vehicle device mounted on a vehicle and to provide with a driving unit, the device including: a control unit controlling the driving unit; and a communication unit for communicating with an in-vehicle ECU to be mounted on the vehicle, in which when an inhibition event for inhibiting diagnosis processing of the driving unit is detected at the time of performing the diagnosis processing, the control unit outputs a detection result notification indicating that the inhibition event is detected to the in-vehicle ECU through the communication unit.

12 Claims, 5 Drawing Sheets

(58) Field of Classification Search
CPC ............ B60W 50/0205; F02D 41/2403; F02D 41/266; F02D 2041/228; F02D 41/22
See application file for complete search history.

(56) References Cited

FOREIGN PATENT DOCUMENTS

| | | |
|---|---|---|
| JP | H06-286534 A | 10/1994 |
| JP | H11-190256 A | 7/1999 |
| JP | 2004-330892 A | 11/2004 |
| JP | 2011-107043 A | 6/2011 |
| JP | 2013-028238 A | 2/2013 |
| JP | 2014-203181 A | 10/2014 |
| JP | 2017-224926 A | 12/2017 |
| JP | 2019-183762 A | 10/2019 |
| JP | 2021-033823 A | 3/2021 |

IN-VEHICLE DEVICE, PROGRAM, AND INFORMATION PROCESSING METHOD

CROSS-REFERENCE TO RELATED APPLICATIONS

This application is the U.S. national stage of PCT/JP2022/014986 filed on Mar. 28, 2022, which claims priority of Japanese Patent Application No. JP 2021-066074 filed on Apr. 8, 2021, the contents of which are incorporated herein.

TECHNICAL FIELD

The present disclosure relates to an in-vehicle device, a program, and an information processing method.

BACKGROUND

For example, on a vehicle, a body ECU, which is an in-vehicle ECU generally controlling the devices of a body system, such as a wiper driving device, a lighting device inside or outside the vehicle, a door lock device, and a power window, is mounted (for example, Japanese Patent Laid-Open Publication No. 2017-224926). The wiper driving device of Patent Document 1 is provided with the in-vehicle ECU (the body ECU) and driven by a control program applied to the in-vehicle ECU.

In the driving device of Japanese Patent Laid-Open Publication No. 2017-224926, there is a problem that diagnosis processing of driving parts included in the own device is not considered.

An object of the present disclosure is to provide an in-vehicle device and the like capable of efficiently performing a countermeasure based on diagnosis processing of the own device.

SUMMARY

An in-vehicle device according to one aspect of the present disclosure is an in-vehicle device mounted on a vehicle and to provide with a driving unit, the device including: a control unit controlling the driving unit: and a communication unit for communicating with an in-vehicle ECU to be mounted on the vehicle, in which when an inhibition event for inhibiting diagnosis processing of the driving unit is detected at the time of performing the diagnosis processing, the control unit outputs a detection result notification indicating that the inhibition event is detected to the in-vehicle ECU through the communication unit.

Effects of Present Disclosure

According to one aspect of the present disclosure, it is possible to provide the in-vehicle device and the like capable of efficiently performing the countermeasure based on the diagnosis processing of the own device.

DETAILED DESCRIPTION OF PREFERRED EMBODIMENTS

Figure 1:
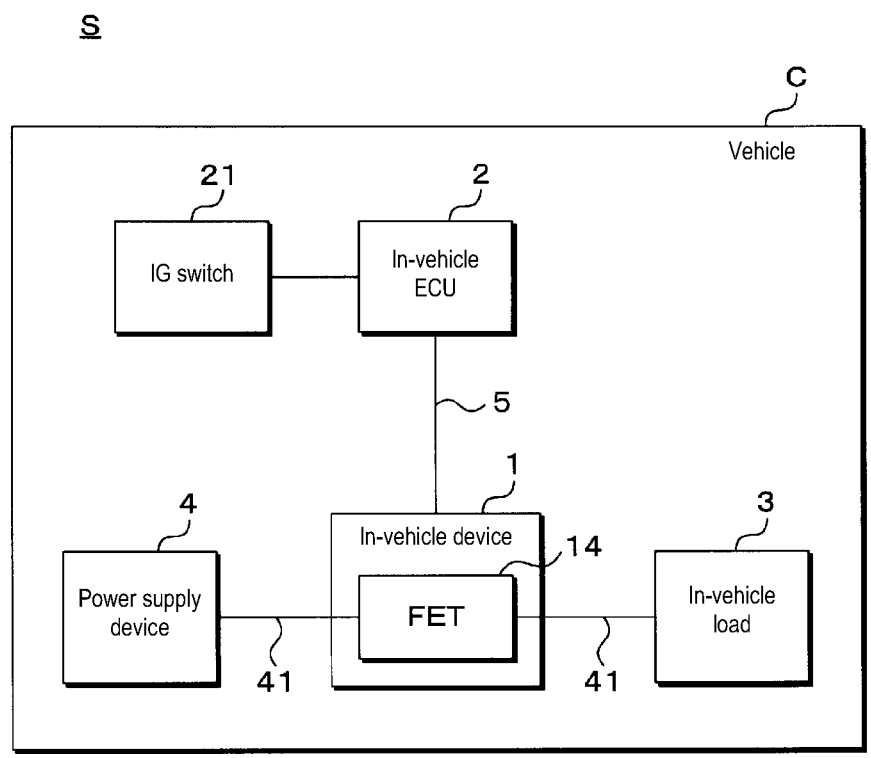
FIG. 1 is a schematic view illustrating a configuration of an in-vehicle system including an in-vehicle device or the like according to Embodiment 1.

First, embodiments of the present disclosure will be described in detail. Ir addition, at least a part of the embodiments described below may be arbitrarily combined.

An in-vehicle device according to one aspect of the present disclosure is an in-vehicle device mounted on a vehicle and to provide with a driving unit, the device including: a control unit controlling the driving unit: and a communication unit for communicating with an in-vehicle ECU to be mounted on the vehicle, in which when an inhibition event for inhibiting diagnosis processing of the driving unit is detected at the time of performing the diagnosis processing, the control unit outputs a detection result notification indicating that the inhibition event is detected to the in-vehicle ECU through the communication unit.

In this aspect, the in-vehicle device mounted on the vehicle includes the driving unit, the control unit, and the communication unit, and communicates with the in-vehicle ECU mounted on the vehicle through the communication unit. The control unit performs the diagnosis processing of the driving unit and outputs (transmits) a diagnosis result such as whether the driving unit, for example, is normal or abnormal to the in-vehicle ECU through the communication unit. Further, in a case where the inhibition event for inhibiting the diagnosis processing is detected at the time of performing the diagnosis processing, the control unit outputs the detection result notification indicating that the inhibition event is detected to the in-vehicle ECU through the communication unit. Accordingly, even in a case where the inhibition event for inhibiting the diagnosis processing occurs due to various factors, and the diagnosis processing of the driving unit mounted on the own device is interrupted or it is not possible to start the diagnosis processing, the control unit is capable of outputting the detection result notification indicating that the inhibition event is detected to the in-vehicle ECU, on the basis of the detection of the inhibition event. Accordingly, even when a state in which the diagnosis processing with respect to the driving unit is not implemented occurs or continues, the in-vehicle device (the control unit) outputs the detection result notification indicating the effect (that the inhibition event is detected) to the in-vehicle ECU, and thus, it is possible to efficiently perform a countermeasure based on the diagnosis processing of the own device.

In the in-vehicle device according to one aspect of the present disclosure, the inhibition event includes an event that the diagnosis processing is interrupted.

In this aspect, since the inhibition event detected by the control unit includes the event that the diagnosis processing is interrupted, even in a case where the diagnosis processing is interrupted after the diagnosis processing is started, it is possible to efficiently perform the countermeasure based on the diagnosis processing of the own device by outputting a detection result notification indicating that the diagnosis processing is interrupted to the in-vehicle ECU.

In the in-vehicle device according to one aspect of the present disclosure, when the diagnosis processing is consecutively interrupted a predetermined number of times or more, the control unit outputs the detection result notification indicating that the inhibition event is detected to the in-vehicle ECU.

In this aspect, in a case where the diagnosis processing is interrupted, for example, the control unit increases a counter value indicating that the diagnosis processing is interrupted by one, counts the number of times of consecutive interruption, and stores the number of times (the counter value) in an accessible storage region such as a storage unit mounted on the own device. In a case where the number of times (the counter value), for example, is a predetermined number of times or more such as 100 times, which is set in advance, that is, in a case where the number of times (the counter value) reaches a predetermined number of times, the control unit outputs the detection result notification indicating that the inhibition event is detected to the in-vehicle ECU. In a case where the diagnosis processing is completed without being interrupted at the time of counting the number of times in which the diagnosis processing is consecutively interrupted, the control unit may reset the counter value increased by one in accordance with the number of times of interruption, for example, may return the counter value to the initial value of 0. Even in a case where the event that the diagnosis processing is interrupted is consecutive, and a state in which the diagnosis processing with respect to the driving unit is not implemented continues, it is possible to efficiently perform the countermeasure based on the diagnosis processing of the own device by outputting the detection result notification indicating that the inhibition event is detected to the in-vehicle ECU when the number of times in which the diagnosis processing is consecutively interrupted reaches the predetermined number of times. In addition, even in a case where the event that the diagnosis processing is interrupted is consecutive, the control unit does not output the detection result notification to the in-vehicle ECU until the number of times of consecutive interruption reaches the predetermined number of times, that is, when the number of times of consecutive interruption is less than the predetermined number of times, and thus, it is possible to prevent the detection result notification from being excessively output.

In the in-vehicle device according to one aspect of the present disclosure, the control unit performs the diagnosis processing of the driving unit when ignition power supply of the vehicle is turned off, and interrupts the diagnosis processing being executed when the ignition power supply is turned on.

In this aspect, an ignition switch (an IG switch) for starting and stopping the vehicle is provided in the vehicle, and the ignition power supply of the vehicle is switched to on from off or to off from on by pressing the IG switch. When the ignition power supply of the vehicle is turned off, the control unit acquires an off signal (a sleep signal) indicating that the ignition power supply is turned off from the in-vehicle ECU through the communication unit, and starts the diagnosis processing of the driving unit, in accordance with the off signal. While the diagnosis processing of the driving unit is executed, for example, in a case where the ignition power supply is turned on by a manipulator of the vehicle pressing the IG switch, and an on signal (a wakeup signal) indicating that the ignition power supply is turned on is acquired from the in-vehicle ECU through the communication unit, the control unit interrupts the diagnosis processing of the driving unit, in accordance with the on signal. Accordingly, the control unit executes and interrupts the diagnosis processing, in accordance with the manipulation on the IG switch for starting and stopping the vehicle, and in a case where the interruption is performed, it is possible to efficiently perform the countermeasure based on the diagnosis processing of the own device by outputting the detection result notification indicating that the inhibition event is detected to the in-vehicle ECU.

In the in-vehicle device according to one aspect of the present disclosure, the inhibition event includes an event that communication between the control unit and the in-vehicle ECU is disconnected for a predetermined period or longer.

In this aspect, a diagnosis sequence of the driving unit by the control unit includes the diagnosis processing of the driving unit in the own device, and transmission processing of outputting (transmitting) the result (the diagnosis processing result) of the diagnosis processing to the in-vehicle ECU. For example, when outputting (transmitting) the diagnosis processing to the in-vehicle ECU, a state in which the communication with the in-vehicle ECU is not available (a disconnection state) may continue. Alternatively, a case is also assumed in which when a signal for starting the diagnosis processing is output to the in-vehicle device from the in-vehicle ECU, the communication between the in-vehicle ECU and the in-vehicle device is disconnected, and the in-vehicle device is not capable of acquiring (receiving) the signal. Therefore, even in the case of the disconnection state, it is possible to efficiently perform the countermeasure based on the diagnosis processing of the own device by outputting the detection result notification indicating that the inhibition event is detected to the in-vehicle ECU through the communication unit, including such an event (an event that the communication is disconnected) in the inhibition event.

In the in-vehicle device according to one aspect of the present disclosure, the control unit outputs the detection result notification indicating that the inhibition event is detected to the in-vehicle ECU, as a failure notification of the driving unit.

In this aspect, the control unit performs the diagnosis processing of the driving unit included in the own device, on the basis of a predetermined trigger such as a case where the IG switch is turned off, and outputs (transmits) the failure notification to the in-vehicle ECU through the communication unit in a case where an on failure or the like, for example, occurs in the driving unit and is diagnosed as abnormal, as a result of the diagnosis processing. The control unit outputs even the detection result notification indicating that the inhibition event is detected at the time of performing the diagnosis processing with respect to the driving unit to the in-vehicle ECU, as the failure notification of the driving unit. Accordingly, as with the failure notification based on the diagnosis processing normally implemented with the off of the IG switch as a trigger, it is possible to output the detection result notification indicating that the inhibition event is detected at the time of performing the diagnosis processing to the in-vehicle ECU, simplify a communication mode between the in-vehicle device and the in-vehicle ECU, and perform efficient communication processing.

In the in-vehicle device according to one aspect of the present disclosure, the failure notification output to the in-vehicle ECU includes an error code, and the control unit differentiates an error code when the inhibition event for inhibiting the diagnosis processing from an error code detected when the diagnosis processing is completed without being inhibited.

In this aspect, in the case of indicating the detection result notification indicating that the inhibition event such as the interruption of the diagnosis processing is consecutively detected and in the case of indicating an actual failure such as the on failure of the driving unit, the control unit, for example, differentiates the error codes included in the failure notification. As described above, it is possible to perform a notification according to a failure state of the in-vehicle device with respect to the in-vehicle ECU by differentiating the error codes included in the failure notification, in accordance with the reason for outputting the failure notification (the detection result notification).

A program according to one aspect of the present disclosure is a program for allowing a computer controlling a driving unit to execute processing of outputting a detection result notification indicating that an inhibition event for inhibiting diagnosis processing of the driving unit is detected to an in-vehicle ECU connected to the computer such that communication is available when the inhibition event is detected at the time of performing the diagnosis processing.

In this aspect, it is possible to operate the computer as the in-vehicle device capable of efficiently performing the countermeasure based on the diagnosis processing of the own device.

An information processing method according to one aspect of the present disclosure is an information processing method for allowing a computer controlling a driving unit to execute processing of outputting a detection result notification indicating that an inhibition event for inhibiting diagnosis processing of the driving unit is detected to an in-vehicle ECU connected to the computer such that communication is available when the inhibition event is detected at the time of performing the diagnosis processing.

In this aspect, it is possible to provide the information processing method for operating the computer as the in-vehicle device capable of efficiently performing the countermeasure based on the diagnosis processing of the own device.

A specific example of an in-vehicle device 1 according to an embodiment of the present disclosure will be described below with reference to the drawings. Note that, the present disclosure is not limited to the exemplification, but is indicated by the claims, and is intended to include all modifications within the meaning and the scope equivalent to the claims.

Figure 2:
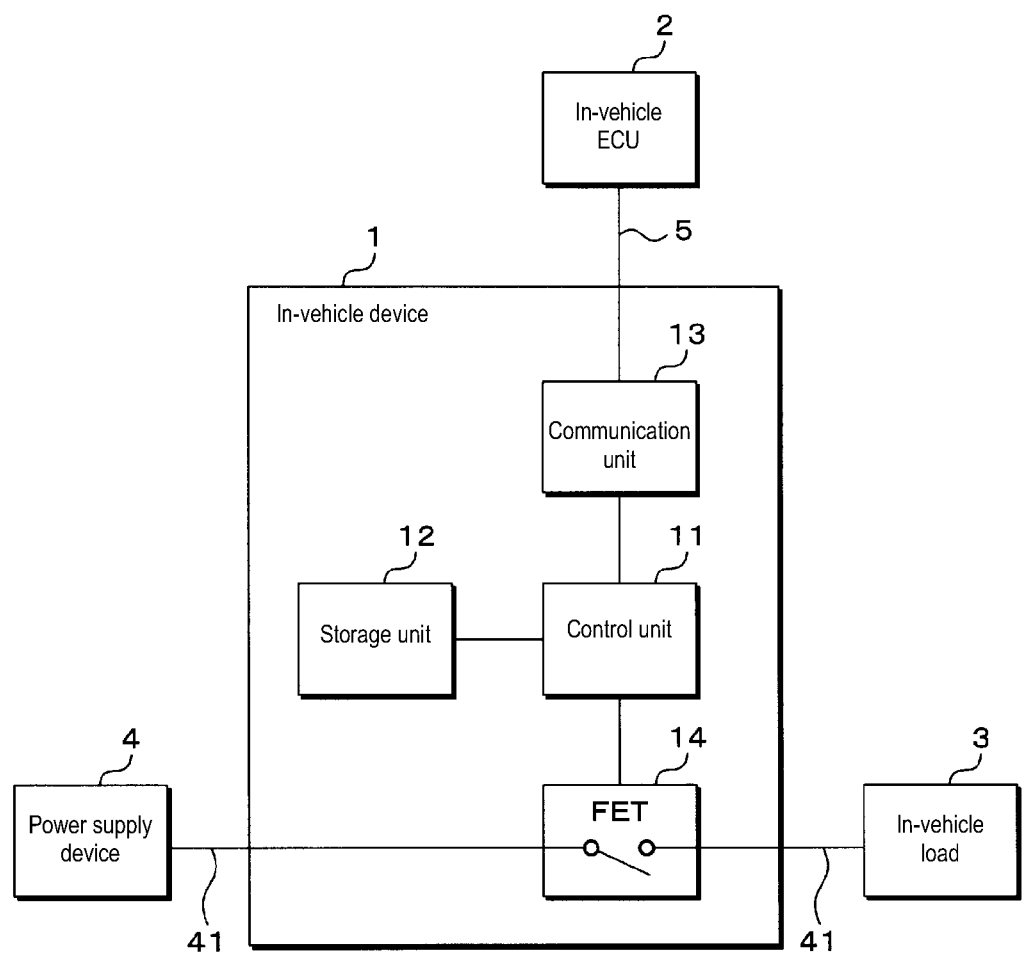
FIG. 2 is a block diagram illustrating an internal configuration of the in-vehicle device.

Hereinafter, an embodiment will be described on the basis of the drawings. FIG. 1 is a schematic view illustrating the configuration of an in-vehicle system S including an in-vehicle device 1 and the like according to Embodiment 1. FIG. 2 is a block diagram illustrating the internal configuration of the in-vehicle device 1. The in-vehicle system S includes the in-vehicle device 1 and an in-vehicle ECU 2, which are connected to each other by a communication line 5 such that communication is available, and the in-vehicle device 1 is connected to a power supply device 4 and an in-vehicle load 3 through a power supply line 41. The in-vehicle device 1, for example, performs control of turning on or off a driving unit 14 included in the own device, on the basis of a control signal output (transmitted) from the in-vehicle ECU 2, and performs the supply or interruption of power output from the power supply device 4 with respect to the in-vehicle load 3 connected to the own device.

The in-vehicle ECU 2 is connected to an IG switch 21 (an ignition switch) for starting or stopping a vehicle C such that communication is available, and outputs (transmits) a signal (Start: a sleep signal, Interruption: a wakeup signal) for instructing the in-vehicle device 1 to start or interrupt diagnosis processing of the driving unit 14 included in the in-vehicle device 1, on the basis of a signal output from the IG switch 21. In the in-vehicle system S configured as described above, the in-vehicle ECU 2 may correspond to a master ECU, and the in-vehicle device 1 may correspond to a sleep ECU.

The power supply device 4, for example, is a secondary battery such as a lead battery, an alternator, or a lithium battery, and is a power source with respect to the in-vehicle load 3 mounted on the vehicle C. The in-vehicle load 3, for example, is an actuator such as a lamp device or a motor, and is driven by power supplied from the power supply device 4 through the driving unit 14 of the in-vehicle device 1.

The in-vehicle device 1 includes a control unit 11, a storage unit 12, a communication unit 13, and a driving unit 14. The control unit 11 includes a central processing unit (CPU), a micro processing unit (MPU), or the like, reads out and executes a program and data stored in the storage unit 12, and performs various control processing pieces including on/off control of the driving unit 14 and the diagnosis processing of the driving unit 14. Alternatively, the control unit 11 may include a field-programmable gate array (FPGA), a system-on-a-chip (SoC), or an application specific integrated circuit (ASIC).

The storage unit 12 includes a volatile memory element such as a random access memory (RAM), or a non-volatile memory element such as a read only memory (ROM), an electrically erasable programmable ROM (EEPROM), or a flash memory. In the storage unit 12, a program, and data for executing the program are stored. As the program and the like, a program and the like read out from a recording medium readable by the in-vehicle ECU 2 may be stored. In addition, the program and the like may be downloaded from an external computer, which is not illustrated and connected to a communication network, which is not illustrated, and may be stored in the storage unit 12. In the storage unit 12, a counter value described below is stored.

The communication unit 13 is a communication interface corresponding to the protocol of a local interconnect network (LIN), a controller area network (CAN), or Ethernet (Registered Trademark). The control unit 11 communicates with the in-vehicle ECU 2 through the communication unit 13, by using a predetermined protocol of LIN or the like.

The driving unit 14, for example, is a semiconductor switch such as a field effect transistor (FET) or an insulated gate bipolar transistor (IGBT), and is turned on or off, on the basis of a driving signal from the control unit 11. In a state where the driving unit 14 is turned on, power output from the power supply device 4 is supplied to the in-vehicle load 3. In a state where the driving unit 14 is turned off, power output from the power supply device 4 is interrupted, and is not supplied to the in-vehicle load 3. The driving unit 14 is not limited to the semiconductor switch such as FET, and may be a mechanical relay, a driving circuit, a motor mechanism, or the like. In the drawings or the like of this embodiment, the driving unit 14 is described as the semiconductor switch (FET), which is one example.

The control unit 11 executes the program stored in the storage unit 12, and thus, functions as a diagnosis processing unit performing the diagnosis processing (diagnostic processing) of the driving unit 14. The control unit 11 functioning as the diagnosis processing unit, for example, starts the diagnosis processing of the driving unit 14, in accordance with the sleep signal transmitted from the in-vehicle ECU 2. The diagnosis processing, for example, detects an on failure (a short failure), an off failure (an open failure), or the like of the driving unit 14, and determines whether there is an abnormality in the driving unit 14, on the basis of the detection result. In a case where it is determined that the driving unit 14 is abnormal, on the basis of the result of the diagnosis processing of the driving unit 14, the control unit 11 outputs a failure notification to the in-vehicle ECU 2. Further, in a case where an inhibition event for inhibiting the diagnosis processing is detected, such as the diagnosis processing being interrupted by some factors, the control unit 11 outputs a detection result notification indicating that an inhibition event is detected to the in-vehicle ECU 2 through the communication unit 13. The details of processing relevant to the detection result notification will be described below.

As with the in-vehicle device 1, the in-vehicle ECU 2 includes a control unit (not illustrated), a storage unit (not illustrated), and a communication unit (not illustrated), and the configuration of such hardware function units is the same as that of the in-vehicle device 1. The in-vehicle ECU 2, for example, a body ECU controlling the entire vehicle C, an engine ECU controlling an actuator such as an engine or a motor, or the like.

The in-vehicle ECU 2 is connected to the IG switch 21 such that communication is available, and in a case where the IG switch 21 is pressed, and the ignition power supply of the vehicle C is turned on from off, the in-vehicle ECU outputs the wakeup signal to the in-vehicle device 1, and transitions the in-vehicle device 1 to a start state from a sleep state. In a case where the IG switch 21 is pressed, and the ignition power supply of the vehicle C is turned off from on, the in-vehicle ECU 2 outputs the sleep signal to the in-vehicle device 1, and transitions the in-vehicle device 1 to the sleep state from the start state.

The in-vehicle ECU 2 and the in-vehicle device 1 periodically perform polling communication, and the in-vehicle device 1 determines whether a communication state between the in-vehicle ECU 2 and the in-vehicle device 1, that is, communication is normal or abnormal.

Figure 3:
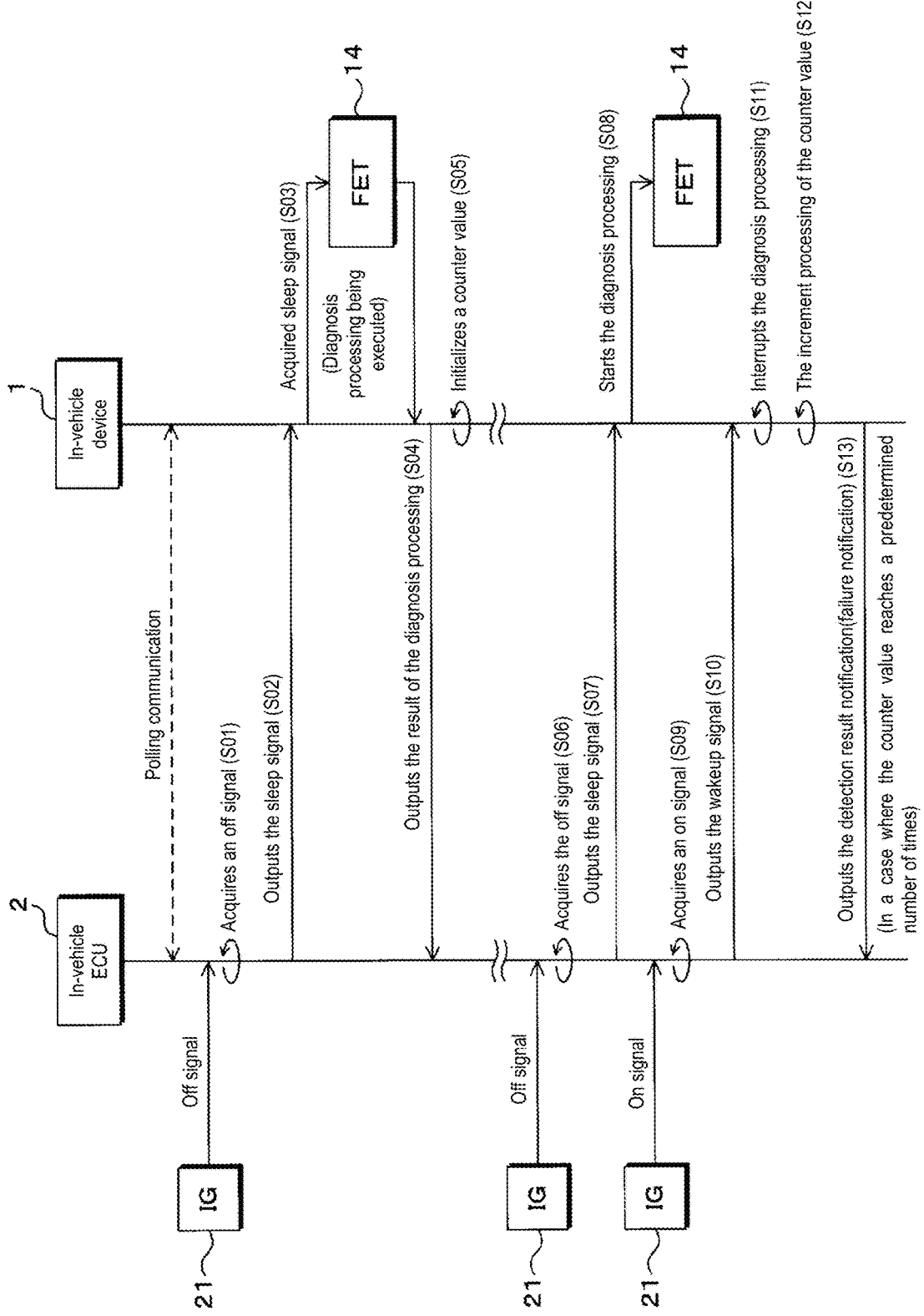
FIG. 3 is an explanatory diagram illustrating a processing sequence according to the in-vehicle device and an in-vehicle ECU.

FIG. 3 is an explanatory diagram illustrating a processing sequence of the in-vehicle device 1 and the in-vehicle ECU 2. The processing of the in-vehicle device 1 and the in-vehicle ECU 2 in this embodiment, for example, is performed with the on or off of the IG switch 21 as a trigger.

The in-vehicle device 1 and the in-vehicle ECU 2, for example, periodically perform the polling communication, and the in-vehicle device 1 detects whether the communication between the in-vehicle device 1 and the in-vehicle ECU 2 is normal or abnormal, which is a disconnection state, on the basis of a response or the like from the in-vehicle ECU 2 with respect to the polling communication. In a case where the communication between the in-vehicle device 1 and the in-vehicle ECU 2 is not available for a predetermined period such as 1 second, the in-vehicle device 1, for example, may determine that the communication between the in-vehicle device 1 and the in-vehicle ECU 2 is in the disconnection state.

The in-vehicle ECU 2 acquires an off signal (turning off the ignition power supply) output from the IG switch 21 (S01). The in-vehicle ECU 2 outputs (transmits) the sleep signal to the in-vehicle device 1, on the basis of the acquired off signal (S02). The in-vehicle ECU 2 acquires the off signal, that is, a signal for turning off the ignition power supply, which is output from the IG switch 21 directly or indirectly connected to the own EUC such that communication is available, and outputs (transmits) the sleep signal generated in accordance with the off signal to the in-vehicle device 1.

The in-vehicle device 1 starts the diagnosis processing of the driving unit 14, on the basis of the acquired sleep signal (S03). The in-vehicle device 1 starts the diagnosis processing of the driving unit 14 included in the own device, on the basis of the sleep signal acquired from the in-vehicle ECU 2 through the communication unit 13. In a case where the diagnosis processing is normally ended (completed), the in-vehicle device 1 outputs (transmits) the result of the diagnosis processing (a diagnosis processing result) to the in-vehicle ECU 2 (S04). A set of processing pieces from the start of the diagnosis processing to the output of the result of the diagnosis processing (the diagnosis processing result) to the in-vehicle ECU 2 is performed by the in-vehicle device 1 as a diagnosis processing sequence.

In a case where the output of the diagnosis processing and the diagnosis processing result to the in-vehicle ECU 2 (the diagnosis processing sequence) is normally completed, the in-vehicle device 1 sets (initializes) a counter value counted at the time of detecting the inhibition event (increment processing) to 0 (S05). The counter value, for example, is stored in a storage region accessible from the control unit 11, such as the storage unit 12 or the like, which is mounted on the in-vehicle device 1, and is a value that is counted at the time of detecting the inhibition event (the increment processing) and increased, and as described above, is initialized (reset) to a value such as 0 in a case where the diagnosis processing sequence is normally completed. By performing such increment processing and initialization processing with respect to the counter value, the counter value indicates the number of times in which the diagnosis processing is consecutively interrupted (the number of times of consecutive interruption), that is, the number of times in which the inhibition event for inhibiting the diagnosis processing is consecutively detected (the number of times of consecutive occurrence of the inhibition event).

Processing from S01 to S05 indicates a case where the diagnosis processing is normally ended (completed). Hereinafter, processing after S06 indicates a case where the diagnosis processing is interrupted.

The in-vehicle ECU 2 acquires the off signal (turning off the ignition power supply) output from the IG switch 21 (S06). The in-vehicle ECU 2 outputs (transmits) the sleep signal to the in-vehicle device 1, on the basis of the acquired off signal (S07). The in-vehicle device 1 starts the diagnosis processing of the driving unit 14, on the basis of the acquired sleep signal (S08). Processing from S06 to S08 is the same as the processing from S01 to S03.

The in-vehicle ECU 2 acquires an on signal (turning on the ignition power supply) output from the IG switch 21 (S09). The in-vehicle ECU 2 outputs (transmits) the wakeup signal to the in-vehicle device 1, on the basis of the acquired on signal (S10). The in-vehicle ECU 2 acquires the on signal, that is, a signal for turning on the ignition power supply, which is output from the IG switch 21 directly or indirectly connected to the own EUC such that communication is available, and outputs (transmits) the wakeup signal generated on the basis of the on signal to the in-vehicle device 1.

The in-vehicle device 1 interrupts the diagnosis processing of the driving unit 14, on the basis of the acquired wakeup signal (S11). While the diagnosis processing of the driving unit 14 is executed, in a case where the wakeup signal output from the in-vehicle ECU 2 is acquired (received), the in-vehicle device 1 interrupts the diagnosis processing being executed.

In a case where the diagnosis processing is interrupted, the in-vehicle device 1 increases the counter value indicating the number of times of consecutive occurrence of the inhibition event by one (the increment processing) (S12). The execution of processing of increasing the counter value by one (the increment processing) is not limited to a case where the diagnosis processing is interrupted, and even in a case where it is determined that the communication between the in-vehicle device 1 and the in-vehicle ECU 2 is in the disconnection state, the increment processing may be executed. That is, the inhibition event for inhibiting the diagnosis processing includes the interruption of the diagnosis processing, and the communication disconnection state between the in-vehicle device 1 and the in-vehicle ECU 2.

In a case where the counter value reaches a predetermined number of times, the in-vehicle device 1 outputs the detection result notification indicating that the inhibition event is consecutively detected to the in-vehicle ECU 2, as the failure notification of the driving unit 14 (S13). The predetermined number of times to be a threshold value with respect to the counter value, for example, is 100 times, which is stored in the storage unit 12 of the in-vehicle device 1. In a case where the counter value reaches the predetermined number of times, that is, in a case where the counter value is the predetermined number of times or more, the in-vehicle device 1 outputs the detection result notification indicating that the inhibition event is consecutively detected to the in-vehicle ECU 2. The in-vehicle device 1 may output the detection result notification to the in-vehicle ECU 2, as the failure notification of the driving unit 14.

In the failure notification, in the case of indicating the detection result notification indicating that the inhibition event such as the interruption of the diagnosis processing is consecutively detected and in the case of indicating an actual failure such as the on failure of the driving unit 14, for example, error codes included in the detection result notification (the failure notification) may be differentiated. That is, the control unit 11 of the in-vehicle device 1 starts the diagnosis processing with respect to the driving unit 14, and sets an error code in the case of detecting the actual failure such as the on failure of the driving unit 14, as the diagnosis result, for example, to 01 when the diagnosis processing is completed without being inhibited. The control unit 11 of the in-vehicle device 1 sets an error code in a case where the inhibition event such as the interruption of the started diagnosis processing is consecutively detected, for example, to 99. As described above, by differentiating the error codes included in the detection result notification (the failure notification), in accordance with the reason for outputting the detection result notification (the failure notification), it is possible for the in-vehicle ECU 2 to perform a suitable procedure in accordance with the error code.

Figure 4:
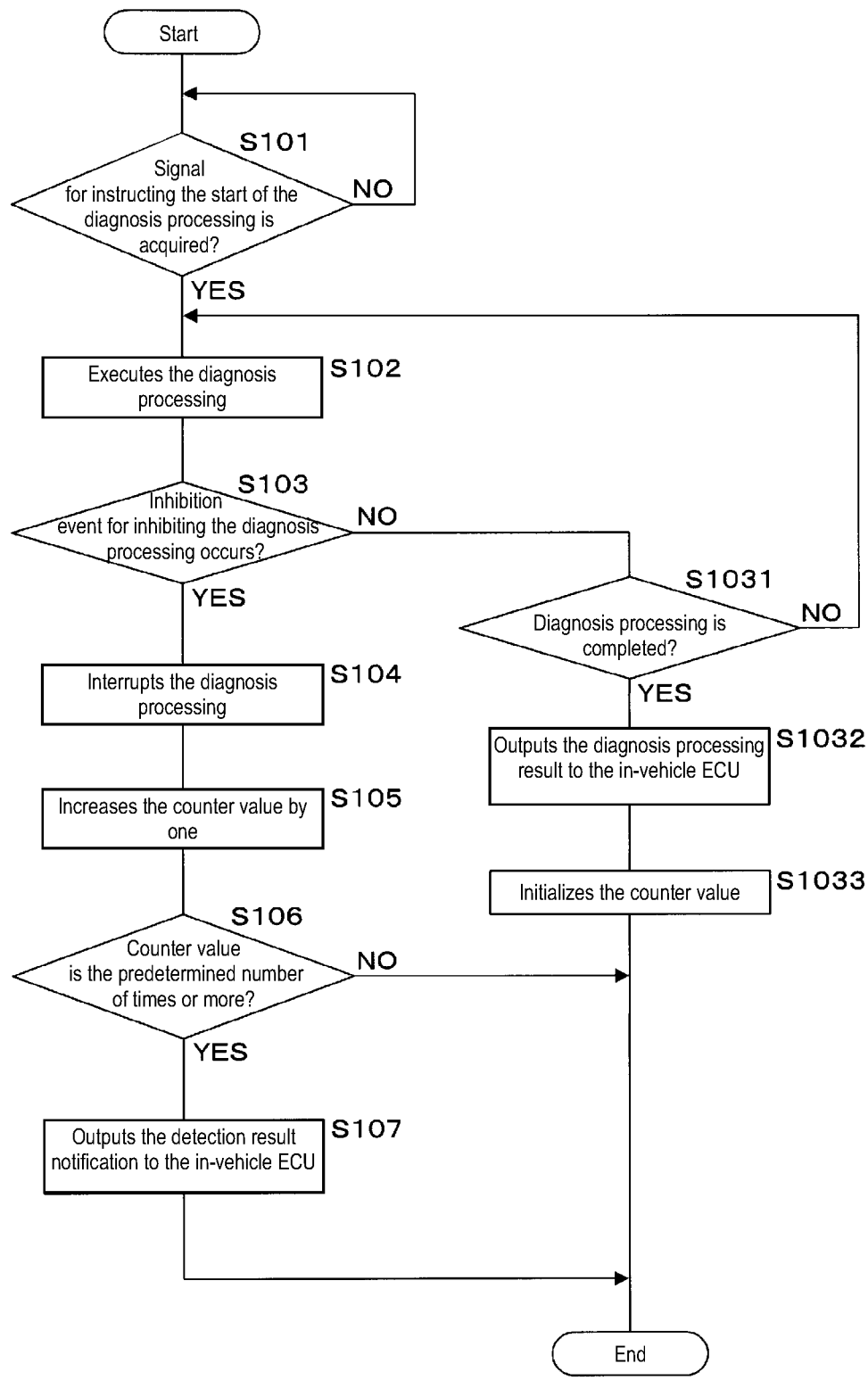
FIG. 4 is a flowchart illustrating processing of a control unit of the in-vehicle device.

FIG. 4 is a flowchart illustrating the processing of the control unit 11 of the in-vehicle device 1. The control unit 11 of the in-vehicle device 1, for example, performs the following processing, on the basis of the signal output from the in-vehicle ECU 2, in accordance with the manipulation on the IG switch 21 (the ignition switch) for starting or stopping the vehicle C.

The control unit 11 of the in-vehicle device 1 determines whether the signal for instructing the start of the diagnosis processing of the driving unit 14 is acquired (S101). The control unit 11 of the in-vehicle device 1 determines whether the signal for instructing the start of the diagnosis processing of the driving unit 14, such as the sleep signal output from the in-vehicle ECU 2, is acquired. In a case where the signal for instructing the start of the diagnosis processing (the sleep signal) is not acquired (S101: NO), the control unit 11 of the in-vehicle device 1 performs loop processing of executing again the processing of S101, and thus, allows standby processing of the signal output from the in-vehicle device 1 to continue.

In a case where the signal for instructing the start of the diagnosis processing (the sleep signal) is acquired (S101: YES), the control unit 11 of the in-vehicle device 1 executes the diagnosis processing of the driving unit 14 (S102). For example, in a case where the signal for instructing the start of the diagnosis processing, such as the sleep signal, is output from the in-vehicle ECU 2, the control unit 11 of the in-vehicle device 1 starts the diagnosis processing of the driving unit 14, in accordance with the sleep signal. Accordingly, the in-vehicle device 1 is in a state where the diagnosis processing of the driving unit 14 is being executed.

The control unit 11 of the in-vehicle device 1 determines whether the inhibition event for inhibiting the diagnosis processing occurs (S103). In a state where the diagnosis processing of the driving unit 14 is being executed, the control unit 11 of the in-vehicle device 1 determines whether the inhibition event for inhibiting the diagnosis processing occurs. The inhibition event for inhibiting the diagnosis processing, for example, is the interruption of the diagnosis processing by the wakeup signal output from the in-vehicle ECU 2.

In a case where the inhibition event does not occur (S103: NO), the control unit 11 of the in-vehicle device 1 determines whether the diagnosis processing is completed (S1031). The diagnosis processing, for example, includes a processing sequence set in advance to diagnose the presence or absence of the on failure and the off failure with respect to the driving unit 14 such as FET. In a case where the processing sequence is executed to the end, the control unit 11 of the in-vehicle device 1 determines that the diagnosis processing is completed. The control unit 11 of the in-vehicle device 1 may monitor the progress state of the processing sequence at a predetermined cycle, and may detect a completion signal or the like output in a case where the processing sequence is executed to the end, and thus, may determine that the diagnosis processing is completed. In a case where the diagnosis processing is not completed (S1031: NO), the diagnosis processing is being executed, and the control unit 11 of the in-vehicle device 1 continuously executes the diagnosis processing (S102). That is, in a state where the diagnosis processing of the driving unit 14 is being executed, the control unit 11 of the in-vehicle device 1 allows the processing of periodically determining whether the wakeup signal is output from the in-vehicle ECU 2 to continue.

In the drawings of this embodiment, the processing of S103 and S1031 is sequentially performed, and in a case where the inhibition event does not occur (S103: NO) and the diagnosis processing is not completed (S1031: NO), the control unit 11 of the in-vehicle device 1 performs the loop processing of executing again the processing of S102, but the present disclosure is not limited thereto. While the diagnosis processing is executed (S102), for example, in a case where the signal for instructing the interruption of the diagnosis processing, such as the wakeup signal, is acquired (received) from the in-vehicle ECU 2, the control unit 11 of the in-vehicle device 1 may generate an interruption signal, on the basis of the signal, and may output the interruption signal to a process performing the diagnosis processing, and thus, may interrupt the diagnosis processing.

In a case where the diagnosis processing is completed (S1031: YES), the control unit 11 of the in-vehicle device 1 outputs the diagnosis processing result to the in-vehicle ECU 2 (S1032). In a case where the diagnosis processing with respect to the driving unit 14 is normally completed, and it is determined that the driving unit 14 is abnormal, on the basis of the result of the diagnosis processing, the control unit 11 of the in-vehicle device 1 outputs the failure notification (the diagnosis processing result) to the in-vehicle ECU 2.

The control unit 11 of the in-vehicle device 1 initializes the counter value indicating the number of times of consecutive occurrence of the inhibition event (S1033). The control unit 11 of the in-vehicle device 1 initializes the counter value stored in the storage unit 12, for example, to "0". That is, in a case where the diagnosis processing is normally completed, the counter value is reset.

In a case where the inhibition event occurs (S103: YES), the control unit 11 of the in-vehicle device 1 interrupts the diagnosis processing (S104). As described above, the inhibition event, for example, is the interruption of the diagnosis processing by the wakeup signal output from the in-vehicle ECU 2, and in a case where the wakeup signal is acquired (received), the control unit 11 of the in-vehicle device 1 interrupts the diagnosis processing being executed.

The control unit 11 of the in-vehicle device 1 increases the counter value indicating the number of times of consecutive occurrence of the inhibition event by one (the increment processing) (S105). The control unit 11 of the in-vehicle device 1 increases the counter value stored in the storage unit 12 by one (the increment processing).

The control unit 11 of the in-vehicle device 1 determines whether the counter value is the predetermined number of times or more (S106). The predetermined number of times to be the threshold value with respect to the counter value, for example, is 100 times, which is stored in the storage unit 12 of the in-vehicle device 1, and the control unit 11 of the in-vehicle device 1 determines whether the counter value is the predetermined number of times or more, that is, the counter value reaches the predetermined number of times.

In a case where the counter value is the predetermined number of times or more (S106: YES), the control unit 11 of the in-vehicle device 1 outputs the detection result notification indicating that the inhibition event is consecutively detected to the in-vehicle ECU 2 (S107). In a case where the counter value is the predetermined number of times or more, the control unit 11 of the in-vehicle device 1 outputs the detection result notification indicating that the interruption of the diagnosis processing, which is the inhibition event, is consecutively performed the predetermined number of times or more to the in-vehicle ECU 2. The control unit 11 of the in-vehicle device 1 may output the detection result notification to the in-vehicle ECU 2, as the failure notification of the driving unit 14. Accordingly, even when the event that the diagnosis processing is interrupted is consecutive, and a state in which the diagnosis processing with respect to the driving unit 14 is not implemented continues, it is possible to efficiently performing a countermeasure based on the diagnosis processing of the own device by outputting the failure notification to the in-vehicle ECU 2 in a case where the number of times of consecutive interruption of the diagnosis processing reaches the predetermined number of times.

In a case where the counter value is not the predetermined number of times or more (S106: NO), the control unit 11 of the in-vehicle device 1 ends a set of processing pieces in this flowchart, after the execution of S107 or after the execution of S1033. Alternatively, the control unit 11 of the in-vehicle device 1 may perform the loop processing of executing again the processing of S101, after the execution of such processing.

Figure 5:
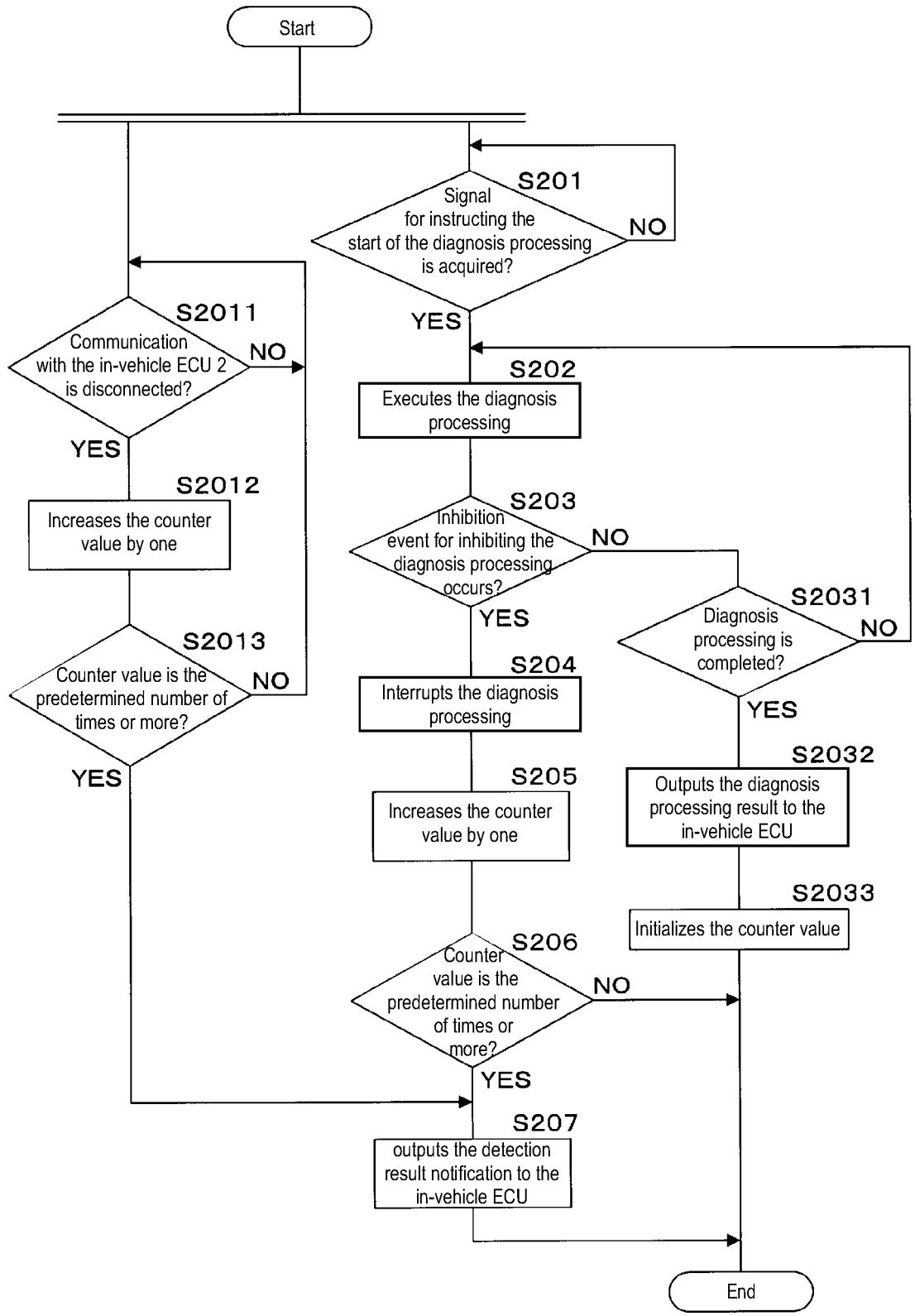
FIG. 5 is a flowchart illustrating processing of the control unit of the in-vehicle device according to Embodiment 2 (communication disconnection).

FIG. 5 is a flowchart illustrating the processing of control unit 11 of the in-vehicle device 1 according to Embodiment 2 (communication disconnection). As with Embodiment 1, the control unit 11 of the in-vehicle device 1, for example, performs the following processing, on the basis of the signal output from the in-vehicle ECU 2, in accordance with the manipulation on the IG switch 21 (the ignition switch) for starting or stopping the vehicle C. As with the processing from S101 to S106 or S1033 of Embodiment 1, the control unit 11 of the in-vehicle device 1 performs processing from S201 to S206 or S2033.

The control unit 11 of the in-vehicle device 1 determines whether the communication with the in-vehicle ECU 2 is disconnected (S2011). The control unit 11 of the in-vehicle device 1, for example, performs the periodic polling communication with the in-vehicle ECU 2 through the communication unit 13. The control unit 11 of the in-vehicle device 1 determines whether the communication between the in-vehicle device 1 and the in-vehicle ECU 2 is normal or abnormal (disconnected), on the basis of a response from the in-vehicle ECU 2 with respect to the polling communication. In a case where a state in which the communication between the in-vehicle device 1 and the in-vehicle ECU 2 is disconnected, for example, continues for a predetermined period or longer, such as 1 second or longer, the control unit 11 of the in-vehicle device 1 may determine that the communication between the in-vehicle device 1 and the in-vehicle ECU 2 is disconnected. The control unit 11 of the in-vehicle device 1, for example, may execute the processing of S201 and S2011 as parallel processing by generating a sub-process or multithreading.

In a case where the communication with the in-vehicle ECU 2 is not disconnected (S2011: NO), that is, in a case where the communication between the in-vehicle device 1 and the in-vehicle ECU 2 is normal, the control unit 11 of the in-vehicle device 1 performs the loop processing of executing again the processing of S2011. That is, the control unit 11 of the in-vehicle device 1 allows success/failure determination of the communication between the in-vehicle device 1 and the in-vehicle ECU 2 to continue by using the polling communication with respect to the in-vehicle ECU 2.

In a case where the communication with the in-vehicle ECU 2 is disconnected (S2011: YES), the control unit 11 of the in-vehicle device 1 increases the counter value indicating the number of times of consecutive occurrence of the inhibition event by one (the increment processing) (S2012). As with the processing of S105 in Embodiment 1 (S205), the control unit 11 of the in-vehicle device 1 increases the counter value stored in the storage unit 12 by one (the increment processing). That is, the counter value subjected to the increment processing in S205, and the counter value subjected to the increment processing in S2012 are the same counter value (a counter value defined in the same variable).

The control unit 11 of the in-vehicle device 1 determines whether the counter value is the predetermined number of times or more (S2013). As with the processing of S106 in Embodiment 1 (S206), the control unit 11 of the in-vehicle device 1 performs the processing of S2013. In a case where the counter value is not the predetermined number of times or more (S2013: NO), that is, in a case where the counter value is less than the predetermined number of times, the control unit 11 of the in-vehicle device 1 performs the loop processing of executing again the processing of S2011.

In a case where the counter value is the predetermined number of times or more (S2013: YES), or after the execution of S206, the control unit 11 of the in-vehicle device 1 outputs the detection result notification indicating that the inhibition event is consecutively detected to the in-vehicle ECU 2 (S207). As with the processing of S107 in Embodiment 1, the control unit 11 performs the processing of S207.

A case is assumed in which when a signal for starting the diagnosis processing (the sleep signal) is output to the in-vehicle device 1 from the in-vehicle ECU 2, the communication between the in-vehicle ECU 2 and the in-vehicle device 1 is disconnected, and the in-vehicle device 1 is not capable of acquiring (receiving) the signal. In contrast, the inhibition event for performing the increment processing with respect to the counter value includes the disconnection state of the communication between the in-vehicle ECU 2 and the in-vehicle device 1, in addition to the interruption of the diagnosis processing, and the detection result notification (the failure notification) indicating that the inhibition event is consecutively detected is output to the in-vehicle ECU 2, and thus, it is possible to efficiently perform the countermeasure based on the diagnosis processing of the in-vehicle device 1.

The embodiments disclosed herein are illustrative in all respects and should not be considered restrictive. The scope of the present disclosure is indicated by the claims but not the meaning described above, and is intended to include all changes within the meaning and the scope equivalent to the claims.

The invention claimed is:

1. An in-vehicle device to be mounted on a vehicle and to provide with a driving unit, the device comprising:
   a control unit controlling the driving unit; and
   a communication unit for communicating with an in-vehicle ECU to be mounted on the vehicle,
   wherein when an inhibition event for inhibiting diagnosis processing of the driving unit is detected at the time of performing the diagnosis processing, the control unit outputs a detection result notification indicating that the inhibition event is detected to the in-vehicle ECU through the communication unit,
   the control unit outputs the detection result notification indicating that the inhibition event is detected to the in-vehicle ECU, as a failure notification of the driving unit,
   the failure notification output to the in-vehicle ECU includes an error code, and
   the control unit differentiates an error code when the inhibition event for inhibiting the diagnosis processing is detected from a detected error code when the diagnosis processing is completed without being inhibited.

2. The in-vehicle device according to claim 1, wherein the inhibition event includes an event that the diagnosis processing is interrupted.

3. The in-vehicle device according to claim 2, wherein when the diagnosis processing is consecutively interrupted a predetermined number of times or more, the control unit outputs the detection result notification indicating that the inhibition event is detected to the in-vehicle ECU.

4. The in-vehicle device according to claim 3,
   wherein the control unit
   performs the diagnosis processing of the driving unit when ignition power supply of the vehicle is turned off, and
   interrupts the diagnosis processing being executed when the ignition power supply is turned on.

5. The in-vehicle device according to claim 3, wherein the inhibition event includes an event that communication between the control unit and the in-vehicle ECU is disconnected for a predetermined period or longer.

6. The in-vehicle device according to claim 2,
   wherein the control unit
   performs the diagnosis processing of the driving unit when ignition power supply of the vehicle is turned off, and
   interrupts the diagnosis processing being executed when the ignition power supply is turned on.

7. The in-vehicle device according to claim 2, wherein the inhibition event includes an event that communication between the control unit and the in-vehicle ECU is disconnected for a predetermined period or longer.

8. The in-vehicle device according to claim 1,
   wherein the control unit
   performs the diagnosis processing of the driving unit when ignition power supply of the vehicle is turned off, and
   interrupts the diagnosis processing being executed when the ignition power supply is turned on.

9. The in-vehicle device according to claim 8, wherein the inhibition event includes an event that communication between the control unit and the in-vehicle ECU is disconnected for a predetermined period or longer.

10. The in-vehicle device according to claim 1, wherein the inhibition event includes an event that communication between the control unit and the in-vehicle ECU is disconnected for a predetermined period or longer.

11. A computer program product comprising a non-transitory, machine-readable medium storing instructions which, when executed by at least one programmable processor, causes at least one programmable processor to control a driving unit by perform operations comprising:
   outputting a detection result notification indicating that an inhibition event for inhibiting diagnosis processing of the driving unit is detected to an in-vehicle ECU connected to the computer at the time of performing the diagnosis processing,
   wherein a failure notification output to the in-vehicle ECU includes an error code, and
   an error code detected when the inhibition event for inhibiting the diagnosis processing is detected is differentiated from an error code detected when the diagnosis processing is completed without being inhibited.

12. An information processing method for allowing a computer controlling a driving unit to execute processing of
   outputting a detection result notification indicating that an inhibition event for inhibiting diagnosis processing of the driving unit is detected to an in-vehicle ECU connected to the computer at the time of performing the diagnosis processing,
   wherein a failure notification output to the in-vehicle ECU includes an error code, and
   an error code detected when the inhibition event for inhibiting the diagnosis processing is detected is differentiated from an error code detected when the diagnosis processing is completed without being inhibited.

* * * * *